United States Patent
Curbow et al.

(10) Patent No.: US 7,584,253 B2
(45) Date of Patent: Sep. 1, 2009

(54) METHOD AND SYSTEM FOR CREATING AND TRACKING APPOINTMENTS AND TASKS FROM EMAIL MESSAGES

(75) Inventors: David W. Curbow, Sunnvale, CA (US); Anil K. Srivastava, Redwood City, CA (US); Kevin Carosso, Santa Cruz, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 887 days.

(21) Appl. No.: 10/446,742

(22) Filed: May 27, 2003

(65) Prior Publication Data

US 2004/0243677 A1 Dec. 2, 2004

(51) Int. Cl.
*G06F 15/16* (2006.01)
(52) U.S. Cl. .................. 709/206; 715/752
(58) Field of Classification Search .......... 709/206, 709/207, 219, 242; 715/752
See application file for complete search history.

(56) References Cited

U.S. PATENT DOCUMENTS

| | | | |
|---|---|---|---|
| 5,428,784 A * | 6/1995 | Cahill, Jr. .................. 709/206 |
| 5,864,848 A * | 1/1999 | Horvitz et al. ................ 707/6 |
| 6,212,553 B1 * | 4/2001 | Lee et al. .................... 709/206 |
| 6,336,125 B2 * | 1/2002 | Noda et al. .................. 715/531 |
| 6,415,304 B1 * | 7/2002 | Horvitz .................... 715/500.1 |
| 2003/0026392 A1 * | 2/2003 | Brown et al. ............. 379/88.13 |
| 2005/0021638 A1 * | 1/2005 | Caldini et al. ............... 709/206 |
| 2005/0057584 A1 * | 3/2005 | Gruen et al. ................ 345/752 |

OTHER PUBLICATIONS

"Microsoft Office Outlook 2002 User Guide." Released by Jackson State University Office of Information Management.*
Steven L. Rohall, et al.; IBM Research Report; "ReMail: A Reinvented Email Prototype"; Oct. 28, 2003 (3 pgs.).

* cited by examiner

*Primary Examiner*—William C Vaughn, Jr.
*Assistant Examiner*—Scott Christensen
(74) *Attorney, Agent, or Firm*—Osha • Liang LLP

(57) ABSTRACT

Embodiments of the present invention relate to a method and system for scheduling an event based on a user-selected electronic message. The method comprises accessing a user-selected electronic message precipitating the event from an electronic message in-box, scanning the electronic message for information associated with the event, determining the parameters of the event based on information associated with the event, and automatically scheduling the event in an electronic calendar, using the determined parameters.

39 Claims, 6 Drawing Sheets

METHOD AND SYSTEM FOR CREATING AND TRACKING APPOINTMENTS AND TASKS FROM EMAIL MESSAGES

FIELD OF THE INVENTION

Embodiments of the present invention relate to the field of electronic messaging, e.g., electronic mail, and computerized scheduling.

BACKGROUND OF THE INVENTION

The typical modern workplace is heavily computerized, with communication, scheduling, and work output all now either primarily or entirely computer based. Much of the formerly paper intra-office communication can be performed using electronic email.

A problem commonly experienced in a corporate environment is the accumulation of complex scheduling tasks in the course of the business day. It is estimated that there are an average of 2500 messages per any user's inbox at any time. A large percentage of those messages entails or refers to a meeting, appointment or task that is related to one or more users' calendars.

Email is often used to communicate information about a meeting, or a desired meeting, including background information, who should attend, etc., that may require significant coordination efforts. Many times, however, the desired meetings may remain unscheduled because an important message is overlooked or because the coordination effort between several potential attendees' calendars may be too complex to accomplish efficiently. Additionally, manually scheduling and coordinating busy users' calendars may not guarantee that all necessary attendees are notified or that a given user will find messages related to upcoming meetings in time to make use of the information.

Users commonly receive email messages that cause them to immediately create an appointment or task (to do) on a calendar. Later, when looking at the calendar, they need to find the email message that originally caused the scheduled meeting, appointment or task to be created. However, it is extremely difficult to find a specific email when it is lost in thousands of messages, if it is not flagged or linked in some way. Currently, there is no mechanism to assist in either the automatic scheduling or automatic linking of meetings and associated email messages.

SUMMARY OF THE INVENTION

Accordingly, a method and system are presented which create and track appointments, tasks and other schedulable events from email. The method works in conjunction with a user's electronic calendar and provides automatic linking of calendar events and electronic messages.

Embodiments of the present invention relate to a method and system for scheduling an event based on an electronic message. The method comprises selecting an electronic message precipitating the event from an electronic message inbox, scanning the electronic message for information associated with the event, determining the parameters of the event based on information associated with the event, and automatically scheduling the event in an electronic calendar, using the determined parameters.

Tasks and appointments are fundamentally different from email in that they have due-dates, invitees, etc. associated with them. A user interface mechanism that is functioning with embodiments of the present invention works as follows. The user selects some content in an email message, and invokes a command (e.g. button, menu command) and a new appointment or a new task is created in the user's calendar. During this process a dialog is presented that shows subject, due date, summary, etc. and the user is allowed to select from alternatives, or edit this information before selecting "Create" or "OK".

In one embodiment, the user is allowed to automatically create a task or appointment (e.g., in a calendar program) from a received email message. There can be more than one task or appointment created from each email message. Next, the embodiment can create a link in the task so that the user can find the original email message. This may happen by automatically editing the email message to add a link to the created task. If more than one task is created from this one email message, there are links computed in each of the tasks that point to the other tasks. This allows users to locate related tasks.

Also, in another embodiment, a link is created in the email message so that the user can find the task. In one implementation, the subject (or title) of the task being created can be (1) the subject of the email message, (2) a summary that is calculated from the selected text using standard techniques or (3) a user-specified title. This information can be presented in a dialog from which the user can make a selection.

In one embodiment, the due date for a task can be calculated from a previously user-specified preference, e.g., 10 days. The due date for a task can also be calculated by examining the selected text of the received email message, e.g., by examining keywords like "Monday," "Next Monday," or ASAP or other delineated dates. Of course, this varies by culture, etc. For creating an appointment, a similar examination of the selected text is done to find names of people or resources (e.g., conference rooms) by comparing with the user's address book, for example, as well as from the sender and recipients of the message. Alternatively, this list of attendees can be copied from the email sender and the recipients. Some embodiments offer the user a choice of attendees from the recipient list, with the "To:" field recipients holding a higher priority than the "Cc:" field recipients.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The operation and components of this invention can be best visualized by reference to the drawings.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

However, it will be obvious to one of ordinary skill in the art that the present invention may be practiced without these specific details. In other instances, well-known methods, procedures, and components have not been described in detail so as not to unnecessarily obscure aspects of the present invention. At times, concepts disclosed in this discussion of embodiments of the present invention will be made more readily apparent be reference to the Figures.

Figure 1A:
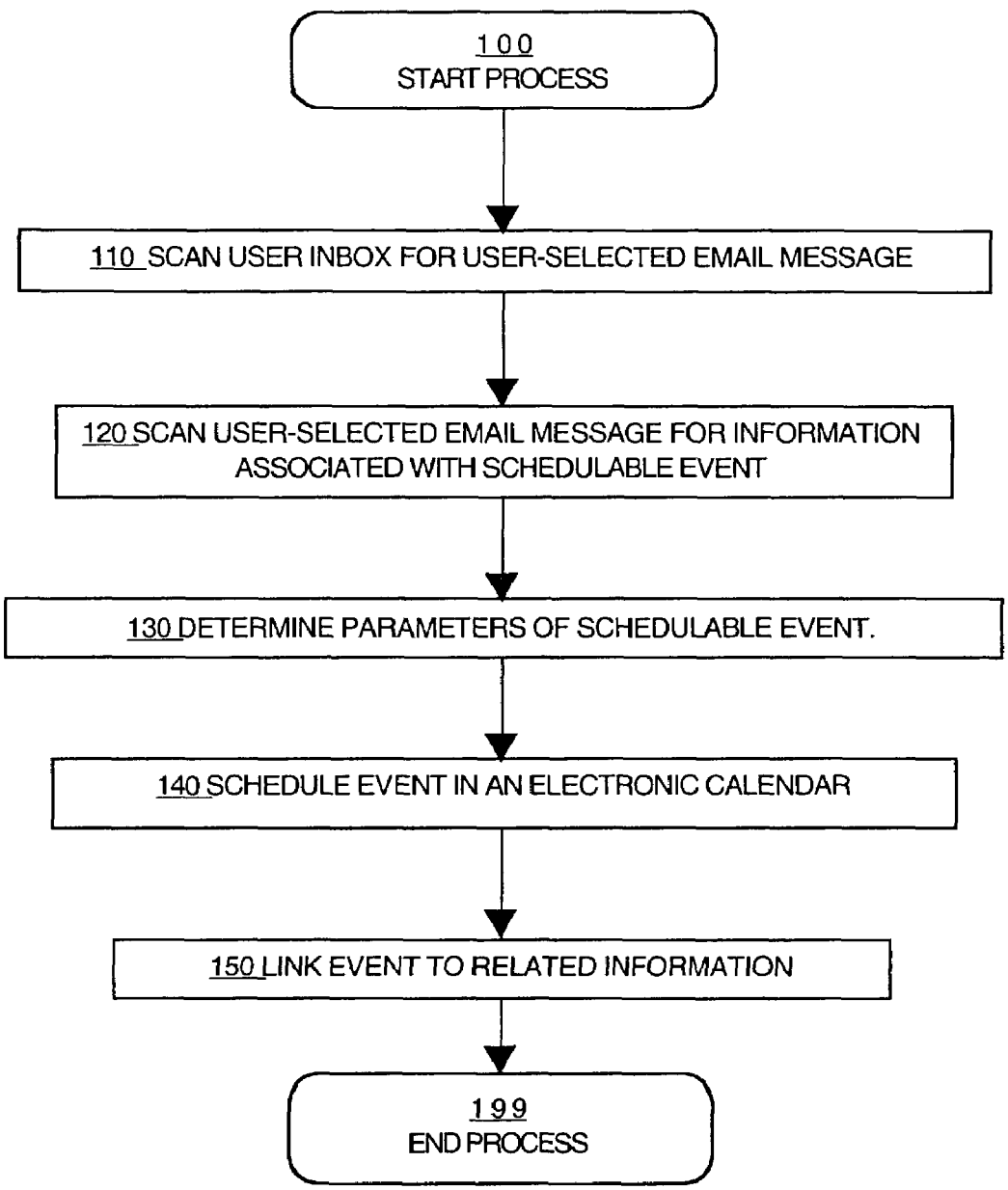
FIG. 1A illustrates a flow diagram of a computer implemented method for automatic task creation in accordance with one embodiment of the present invention.

FIG. 1A illustrates one embodiment of the present invention in flow diagram form. There, computer implemented process 100 starts with an automated scan of the user's electronic communication inbox, at 110, e.g., scans the email in-box. This can be done in response to a received email message. In this embodiment, the scan searches for a user selected email message. In other embodiments, the scan can search for keywords within the text (e.g., a user highlighted text portion of the message) of email messages that are user defined or set in a keyword list. In still other embodiments, other forms of electronic communication may be used, though email is the most common form. The user selected email message is then scanned, at 120, for information that indicates the precipitation of a scheduled event. A precipitation can be a noted need for an event, an already scheduled event, or any other indication that an upcoming event should be scheduled in the user's electronic calendar. It is noted that any of a number of well known calendar programs can be used by embodiments of the present invention.

A date and time, and other parameters, of the associated event are determined at step 130 and the event is automatically entered in the user's calendar, 140. The message is then automatically configured with one or more links that associate it with the calendar entry and any other relevant or desired information 150. The links can be of any appropriate format, whether Hyper-Text Markup Language (html), other automatic link or even a text reference to a location. Also, the generated or created task itself can be linked to the email message. The process ends at 199.

Figure 1B:
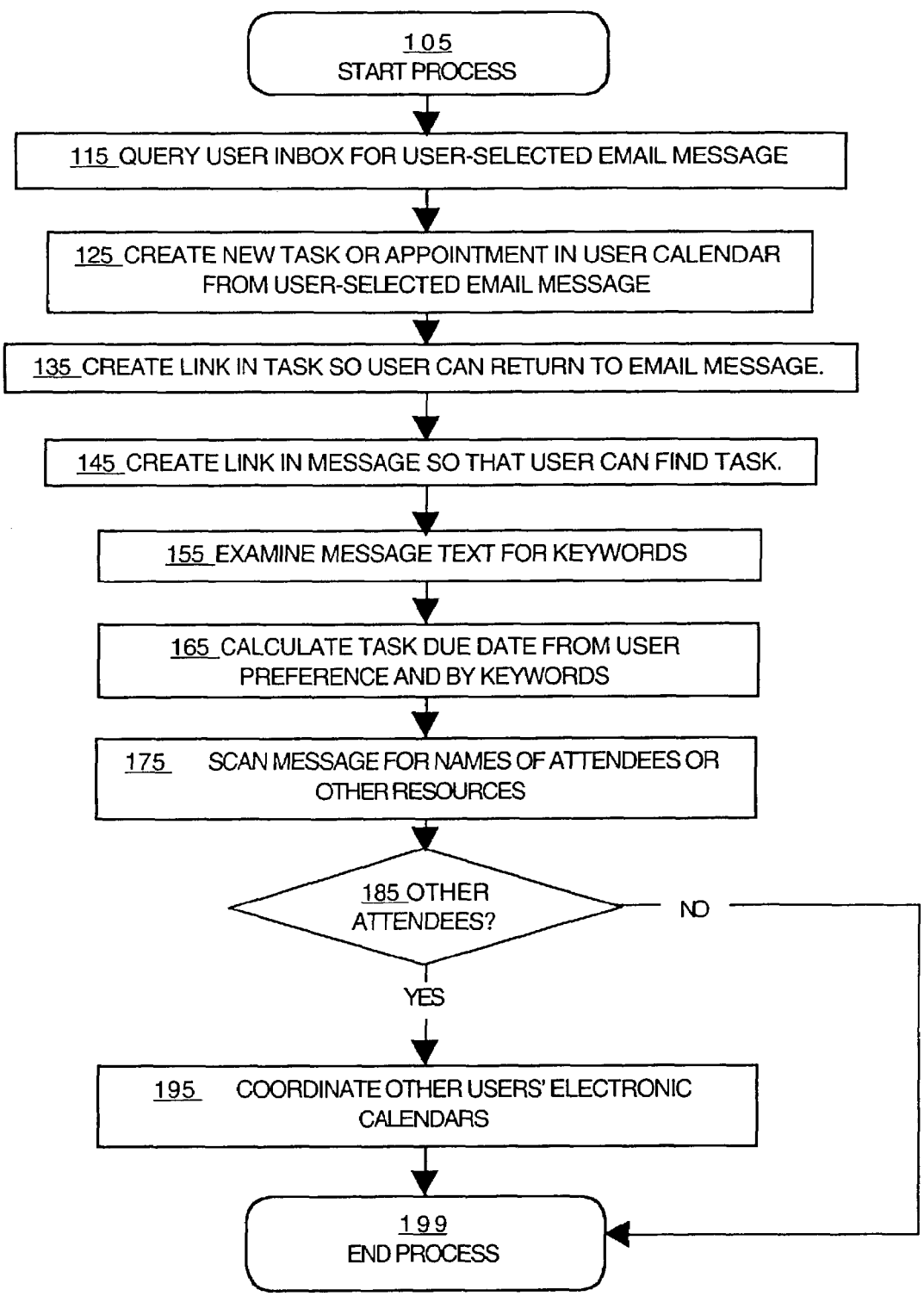
FIG. 1B illustrates a flow diagram of a computer implemented method for automatic calendar meeting creation in accordance with one embodiment of the present invention.

Another embodiment of the present invention is illustrated in FIG. 1B. Here, again, the process, 105, starts with a scan of the user's electronic communication inbox, at 115. In this embodiment, the scan searches for an email message which is either user selected upon the user's reading of the message or by an automated scan of message texts (e.g., a user highlighted passage) for keywords. The keywords can be from a database list or from a user defined set. Again, a new scheduled event, such as a meeting or appointment or a task of some sort is automatically entered in the user's electronic calendar, 125, and a link is created in the email message to the calendar event 145 and in the calendar event to the email 135. It is noted that, in other embodiments of the present invention, the user's inbox is automatically scanned for other email related to the scheduled event and reciprocal links are created in those as well.

In the present embodiment, the message which precipitated the scheduling of the event, and such other email messages as may be included, are scanned for pertinent information, usually in the form of keywords, 155. Again, the keywords can be in a user defined list or in a database list. Keywords can comprise days of the week, time in any number of formats, and priority words such as "immediately" or "urgent". Temporal keywords such as the above are used to determine scheduling priorities in calculating the appropriate time and date of a scheduled event, 165.

A keyword list can also be used to determine the attendee list, 175. The size of a meeting, for example, has a bearing on the necessary facility for the meeting, whose schedule is also consulted in the date/time calculation. If there are other attendees, 185, then those other attendees' calendars are also consulted and, as appropriate, scheduled with the event, 195. If no other attendees, the process ends at 199.

It is noted here that tasks and appointments are fundamentally different from email, in the way they are handled logically, in that they have due-dates, invitees, etc. associated with them. In embodiments of the present invention, a user interface mechanism, such-as discussed and illustrated in FIGS. 1A and 1B, works in the following manner. The user selects some content in an email message, and invokes a command (e.g. button, menu command) and a new appointment or a new task is created in the user's electronic calendar. During this process a dialog is presented that shows subject, due date, summary, etc. and the user is allowed to select from alternatives, or edit this information before selecting "Create" or "OK" or some similar selection option.

Tasks and appointments may be stored in an email store, of which commercially available examples are known in the art, or in a separate database, for example, one specifically used to contain calendar information. It is noted that a link is a URI, or uniform resource identifier. URIs may be of the form "http://", "file://," "imap://," "ical://" or any other form known in the art. In the case of an imap-message URI, the information can include the name of the server, username, message number, etc., which points to the specific message.

In one embodiment of the present invention, the user can selectively create a task or appointment from the email. There can be more than one task or appointment created from each email message. A link is created in the task so that the user can find the original email message and a link is created in the email message for each task, appointment or meeting created.

Figure 2:
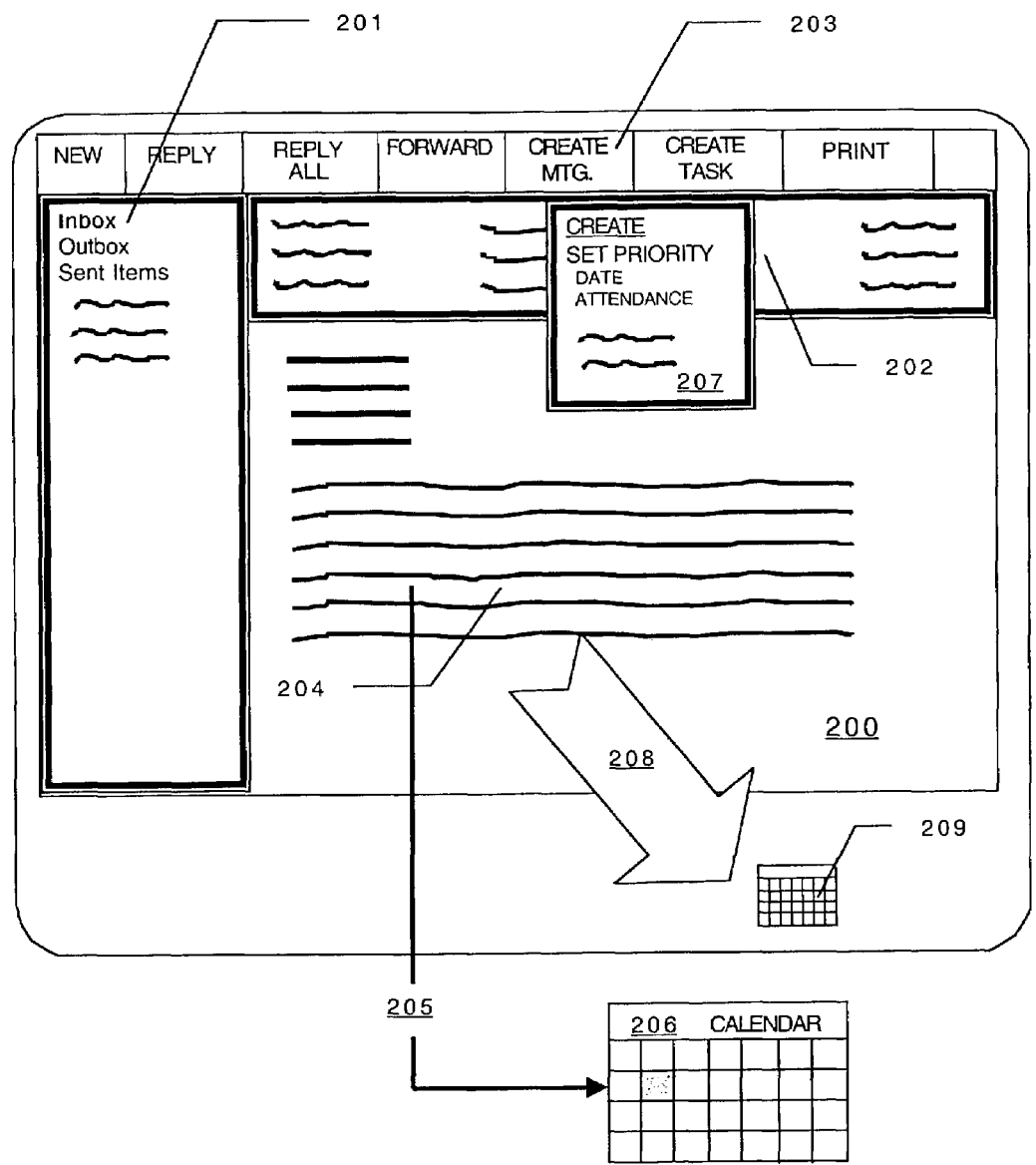
FIG. 2 illustrates a screen shot of an exemplary user interface in accordance with one embodiment of the present invention.

An example of a user interface associated with this embodiment is illustrated in FIG. 2. There, user email interface 200 is displayed on the user's display. The user has selected an email message to be read, 202, in the message inbox, 201. In this illustration, text within the message is highlighted (shown in highlighted form) by the user, 204. In this illustration of this embodiment of the present invention, the user has elected to create a meeting by selecting the option button, 203, available in the user interface, 200.

In some embodiments, a user can select options from a dialog box, such as at 207. Dialog box 207 is illustrated here in order to show possible implementations of embodiments of the present invention. By whatever manner selected, a scheduled event is created and installed in the user's electronic calendar, 206. A link is automatically created in the calendar to point to, and enable the user to quickly and easily find, the creating email. A link is also created in the message to enable the user to quickly and easily find the newly created calendar event.

In another embodiment of the present invention, an event can be created in the user's calendar by "dragging and dropping," 208, the selected, or highlighted, message text in a calendar icon, 209, in the user's graphical user interface (GUI). Alternatively, the entire email message can be selected by dragging message summary 202 onto the calendar icon 209 and dropping it. It is noted that this embodiment can use any cursor control device usable in the GUI, such as keyboard-arrows or the computer mouse.

Embodiments of the present invention enable a user to also drag and drop selected email messages (e.g. from the "message headers" or email table of contents) or selected text in a message currently being viewed, to a day view in a calendar. A day view is one in which hours of the day are shown, such as 8 am, 9 am, 10 am, etc. The start time of the new event can be selected in the insertion of the selected text or message. The insertion in these embodiments triggers the automated scheduling with the associated attendees, etc.

It is noted here that the graphical user interface illustrated in FIG. 2 is shown here only as an example of a user interface employed by embodiments of the present invention. Embodiments can use any user interface suited to email and calendaring functions in a network.

If more than one task or scheduled event is created from one email message, there are links computed in each of the tasks that point to the other tasks. This allows users to find related tasks. A link is also created in the email message so that the user can find the task.

The subject, or title, of the task being created may be the subject of the email message, a summary that is calculated from the selected text using standard techniques, or can be specified by the user. This information can be presented in a dialog box or other user input mechanism so that the user can exercise options.

For an example, assume the user has chosen "Create Meeting" (203). Because meetings usually have attendees/invitees, the system offers (in a dialog) the recipients of the email message as possible attendees. Embodiments can even go so far as to categorize the recipients in the "To:" field of the message as Required Attendees, while those recipients on the "Cc:" field can remain as optional attendees.

The date of the meeting can be calculated from information based on the set of attendees and their availability. For example, if one person is a required attendee and isn't available until March 1, then March 1 would be the first available time that the system would offer as an option to the scheduling user. It is noted that this functionality is available in standard calendar scheduling. The time allotted for a meeting or task or other schedulable event can be either calculated automatically, selected by the user, or defaulted to a previously selected user preference.

The due date for a task, as opposed to a meeting, can be calculated from a previously specified user preference, for example, 10 days. The due date for a task can also be calculated by examining the selected text looking for keywords like "Monday", "Next Monday", "ASAP" or dates in any number of formats. It is noted that this text examination can be varied by cultural language differences. For example, "Thursday Next" or "Half 6" are common in British English but rare in American English. It is noted here that there are well known tools for seeking such keywords in text.

For an appointment, a similar examination of the selected text can be done to find names of people or resources, such as conference rooms, by comparing with the user's address book, as well as from the sender and recipients of the message. Alternately, the list of attendees can be copied from the email sender and recipients alone.

It is noted that there are tools well known in the art that can drag selected text in a mail message to a calendar icon and will make an appointment, including that selected text in the description field. However, attendees are not copied, or anything else, from the original message and no link is created between the calendar appointment and the email.

In other embodiments of the present invention, users are able to graphically drag and drop selected messages or other text to a day view of the user's calendar and pick the start time of the event. The length of the event is then determined by a user preference, e.g. a one hour default for meetings. The user can then change the length of the meeting by resizing the block.

Figure 3:
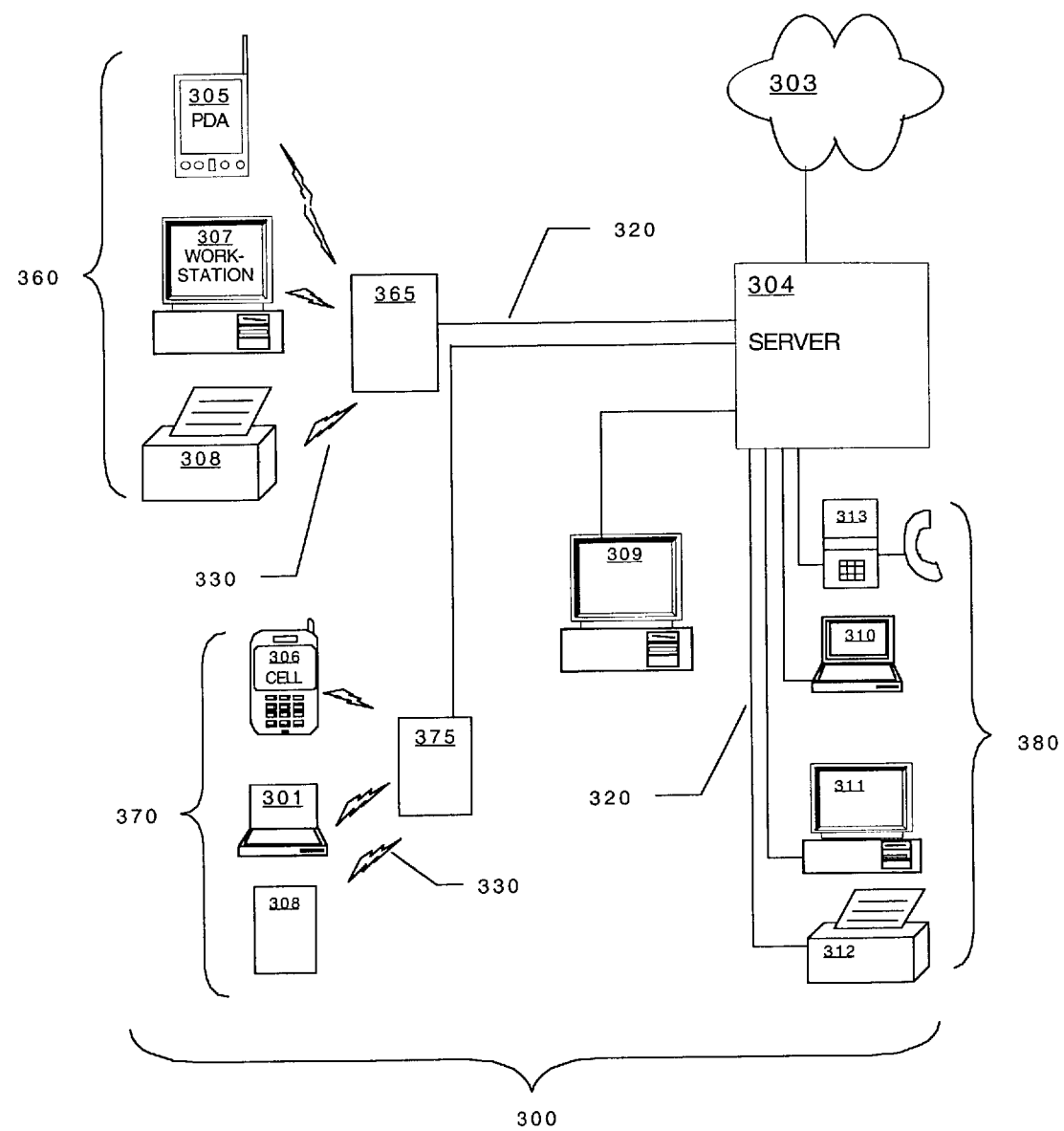
FIG. 3 illustrates an exemplary computer network in accordance with one embodiment of the present invention.

FIG. 3 is an illustration of an exemplary computer network that can be used in this embodiment of the present invention. Exemplary network 300 includes server system 304 connected by data lines 320 to work centers 360, 370 and 380, as well as computer 309. The computers and peripherals that can make up work center 380, computer 311, laptop 310, printer 312 and voice over internet protocol (VoIP) telephone 313, may be connected by individual data lines 320 to server system 304. Wireless personal area network (PAN) work centers 360 and 370 may be in wireless communication, 330, with PAN hubs 365 and 375, respectively. Work center 360 may include work station 307, printer 308 and wireless-enabled personal data assistant (PDA) 305.

Work center 370 may include laptop computer 301, cellular phone 306 and pager 308. Cellphone 306 is, in this example, enabled to communicate with the network via wireless hub 375, as is pager 308. In FIG. 3, network 300 is also shown linked to Internet 303 by server 304. Note that the arrangement and numbers of computers, peripherals, and connections shown in this example are only for illustrative purposes. This embodiment of the present invention is not dependent on the precise compliment of the network on which it operates. However, in the embodiments of the present invention discussed herein, a user is expected to have access to a means of sending and receiving email messages and a means of accessing an electronic calendar. PDA 305, cellular phone 306, workstation 307, laptops 301 and 310, and desktops 309 and 311, are all, in this illustration, capable of email and calendar access.

Figure 4:
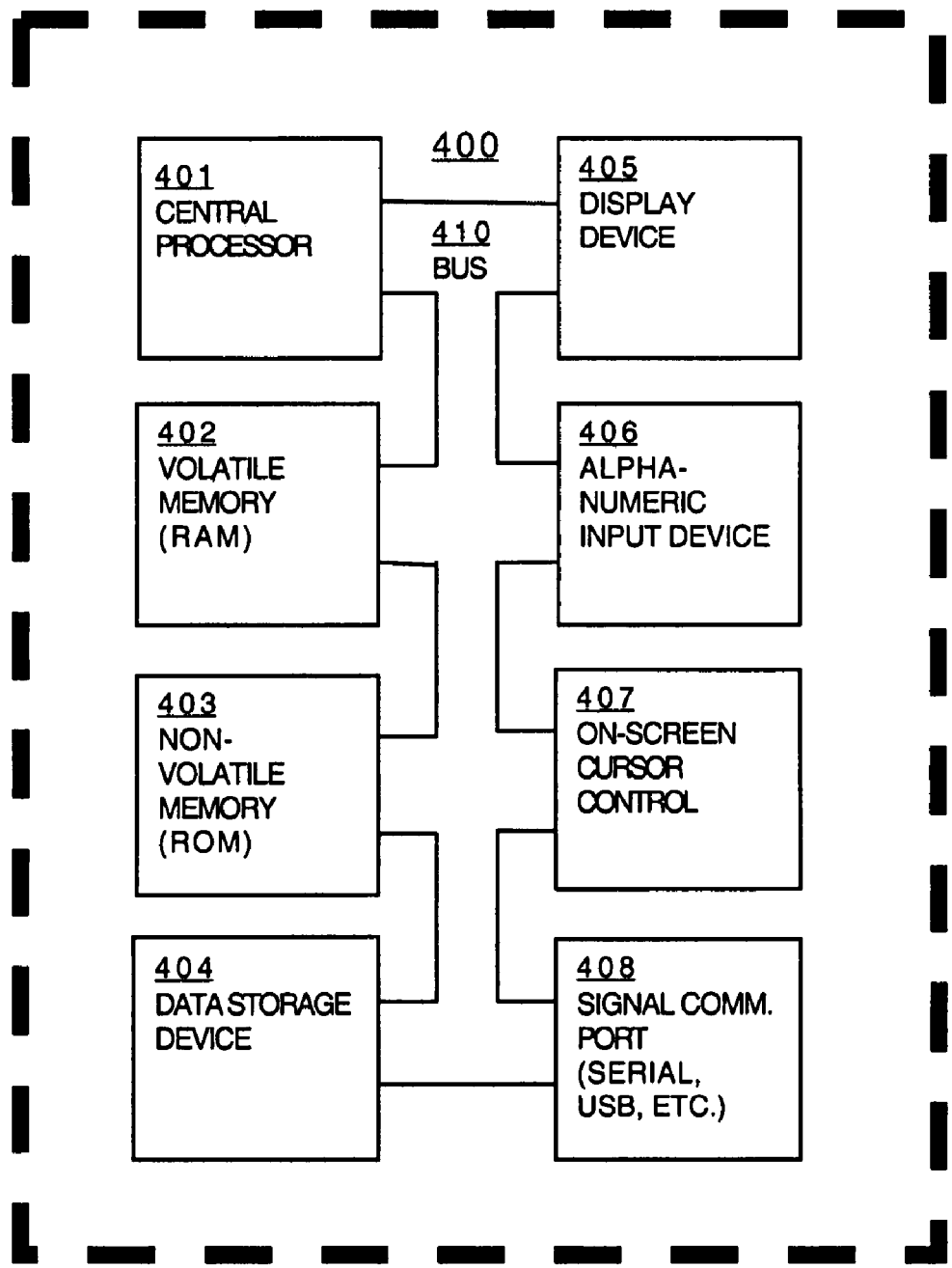
FIG. 4 illustrates a generic computer such as would be used in accordance with one embodiment of the present invention.

The embodiment of the present invention discussed here may be implemented as software programming code used by a computer similar to the generic computer illustrated in FIG. 4, in block diagram form. There, an exemplary computer system 400, e.g., server system 304, system 311, 310, 301, 307, etc., comprises bus 410 which electronically connects central processor 401, volatile RAM 402, non-volatile ROM 403 and data storage device 404. Optional display device 405 is also connected to the bus. Similarly connected are optional alpha-numeric input device 406, optional cursor control 407, and signal I/O device 408. Signal I/O device 408 could be implemented as a serial connection, USB, an infrared transceiver or an RF transceiver. In this embodiment of the present invention, device 408 is utilized to provide connection with a network and is, therefore, part of the path of electronic communication in the network. Generic computer 400 is illustrative of many of the devices found in exemplary network 300, shown in FIG. 3, such as work station 307 and server 304, among others.

Many of the devices illustrated in the exemplary network illustrated in FIG. 3 are enabled to communicate via the network 300 using email. In a large modern workplace, the volume of email, such as that related to upcoming events and meetings, between users of the local network and of the Internet is extremely large. Embodiments of the present invention are useful in allowing users to create and manage schedulable events precipitated by email messages.

Most users in the network 300 have electronic calendar applications that keep track of the user's project milestones and deadlines and of the meetings that inevitably accompany communications between large numbers of people. Electronic calendars, like email, are enabled by the computers and the network to which they are connected. In some cases, calendar applications and calendar databases are resident in a server, such as 304 in FIG. 3. In such cases, the calendar can be easily coordinated for all users.

Figure 5:
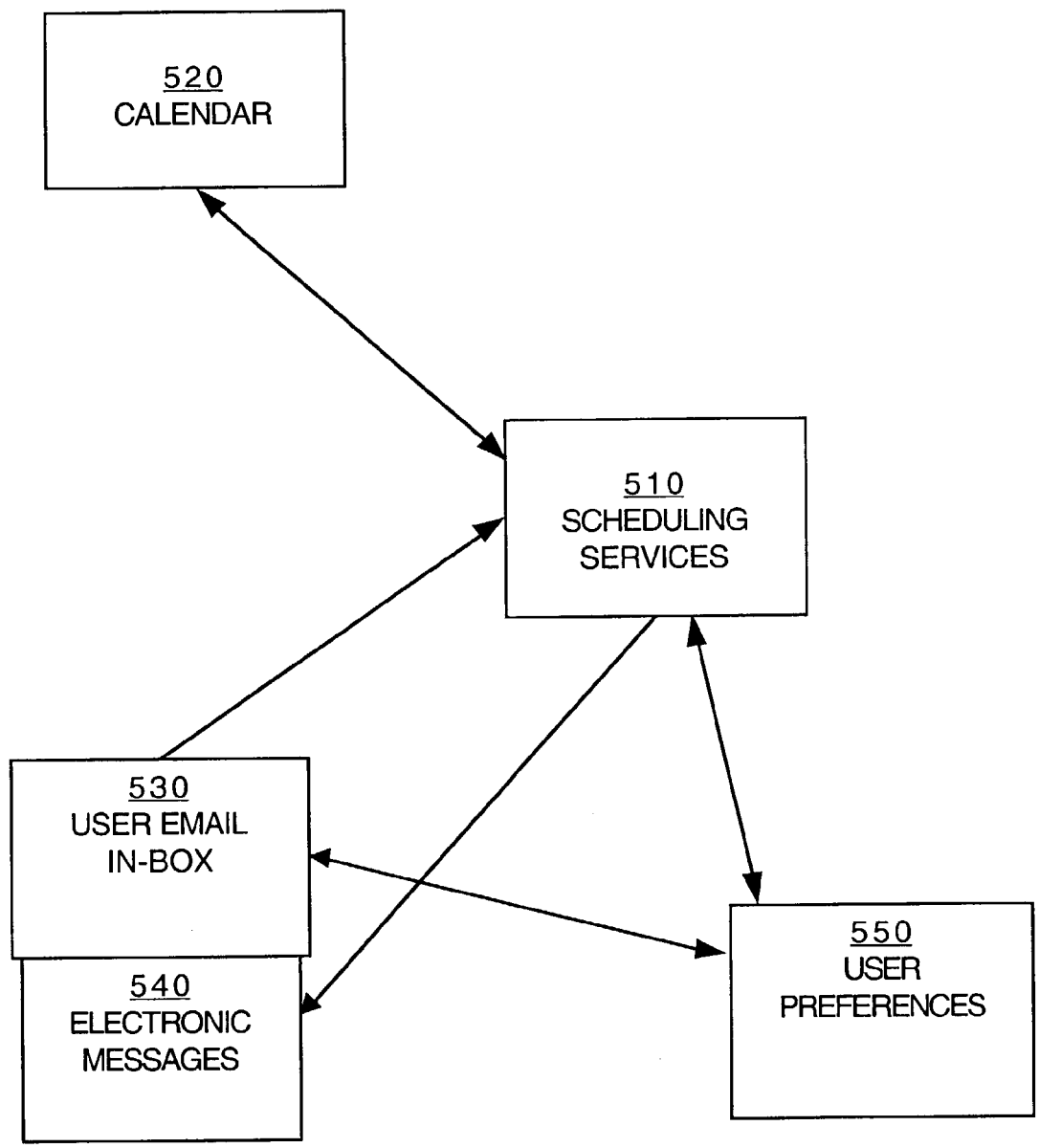
FIG. 5 illustrates a data flow diagram between software modules of one embodiment of the present invention.

As shown in FIG. 5, the calendar and calendar database 520 interfaces with scheduling service 510 so that scheduling information regarding schedulable events is obtained in a timely manner. The scheduling service 510 operates according to flow 100 described above and illustrated in FIGS. 1A and 1B. User preferences, 550, impact the checks performed by the scheduling service 510 for locating emails, either at the user's command or automatically, within the user's in-box 530.

This embodiment of the present invention uses information from the user's calendar 520 and email inbox 530, applies some rules from user preferences 550, such as keywords, that describe frequently occurring generic relationships between meetings, events or appointments, and email, such as has been discussed above.

One example of a relationship between appointments and email that can be assessed by an automatic method is shown here. Often the person who has called a meeting, possibly listed as the "owner" or "proposer" or similar term in the precipitating email, will send a common email message to a group of users that have been invited to the meeting. To make it easier for invitees to recognize that the email message relates to the meeting, its title can use the same or a similar title or subject when sending electronic messages 540 relating to the meeting, and links will be created automatically within subsequent messages to the calendar.

Rules that can be applied to information gleaned from a user's email inbox 530 and from the calendar 520 can be applied user preferences as shown in FIG. 5 at 550. Users are allowed, in this embodiment of the present invention, to set preferences 550 for how they want email scanned and can assign links which are not automatically created.

Some example user preferences used in establishing after-schedule links are: the message recipients list of the email matches the list of meeting attendees from the calendar, the message sender matches the meeting owner, the message subject contains keywords defined by the calendar server, such as "event reminder" or "event notification". Temporal keywords contained in the user preferences can be dates, days of the week, relational words such as "in ten days", "no later than tomorrow", etc.

When one or more of these user preferences is satisfied, the automatic message scan can then identify the corresponding calendar event and can inform the user by some available notification mechanism, such as a flag or pop-up. It is appreciated that user preferences are programmable.

A user can also specify that if a particular user preference is met, then the link that is generated can be varying priority, depending on the application. For example, if one user-specified keyword is "immediately", then a high-priority notification can be generated. However, other user preferences may alter to a low priority notification can be generated.

The capabilities incorporated in this embodiment of the present invention allow for further information to be acquired by the user. The same mechanism that establishes links in messages and in calendar events can also inform a user as to whether the other members of a meeting invitee list have or have not read linked messages. This can be advantageous in preparing a user for how much background material will have to be dealt with in the meeting. The same process can also inform users as to the achievement of milestone events in a group project.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A method for scheduling an event based on an electronic message, comprising:

receiving from a first user a request to schedule said event based on said electronic message;

responsive to the request from said first user, automatically scheduling said event, by a scheduling service, in a first electronic calendar associated with said first user, wherein automatically scheduling said event comprises:

accessing a first portion of said electronic message from an electronic message in-box of the first user, wherein said first portion of said electronic message is specified by said first user;

scanning said first portion of said electronic message for information associated with said event;

processing said information associated with said event to obtain a first plurality of parameters, wherein said first plurality of parameters are obtained based on keywords;

storing said event in said first electronic calendar using said first plurality of parameters, wherein said stored event comprises a first link providing access to said electronic message;

modifying said electronic message to comprise a second link providing access to said stored event;

identifying a second user associated with said event based on said first plurality of parameters; and storing said event in a second electronic calendar using said first plurality of parameters, wherein said second electronic calendar is associated with said second user;

responsive to said second user using said first link to access said electronic message, notifying the first user of said access by said second user;

responsive to automatically scheduling said event, automatically scanning the in-box of the first user for at least one other electronic message related to the stored event; and in response to finding at least one other electronic message related to the stored event:

modifying said stored event to include one or more additional links providing access to each other electronic message related to the stored event, and modifying each other electronic message related to the stored event to include a link providing access to said stored event.

2. The method described in claim 1, wherein said event comprises a meeting.

3. The method described in claim 2, wherein said information associated with said event comprises a date related to said meeting.

4. The method described in claim 2, wherein said information associated with said event comprises a designation of an attendee of said meeting.

5. The method described in claim 2, wherein said information associated with said event comprises an agenda for said meeting.

6. The method described in claim 1, further comprising linking said electronic message to said stored event.

7. The method described in claim 1, further comprising linking said stored event to said electronic message.

8. The method of claim 1, wherein scanning said first portion of said electronic message further comprises scanning for user specified key words.

9. The method of claim 1, further comprising presenting a dialog to said first user showing said first plurality of parameters of said event prior to storing said event.

10. The method of claim 1, wherein storing said event further comprises coordinating said event with an electronic calendar of another user.

11. The method of claim 1, wherein said keywords comprises temporal keywords and priority keywords for calculating a date and time for said event.

12. The method of claim 1, further comprising:
scanning said first portion of said electronic message for information associated with a second event;
processing said information associated with said second event to obtain a second plurality of parameters, wherein said second plurality of parameters are obtained based on said keywords; and
storing said second event in said first electronic calendar using said second plurality of parameters.

13. The method of claim 12, further comprising linking said stored second event to said stored event.

14. A system for scheduling an event based on an electronic message, comprising:
a processor;
a memory;
a storage device;
an electronic calendar application for managing a first electronic calendar associated with a first user;
an electronic mail application associated with said first user, wherein said electronic mail application stores said electronic message in an in-box; and
a scheduling service application operatively connected to said first electronic calendar and said electronic mail application, wherein said scheduling service application comprises software instructions stored in the memory for causing the system to:
receive from said first user a request to schedule said event based on a first portion of said electronic message, wherein said first portion of said electronic message is specified by said first user,
responsive to said request from said first user, automatically:
access said first portion of said electronic message from said in-box of the electronic mail application;
scan said first portion of said electronic message for information associated with said event;
process said information associated with said event to obtain a first plurality of parameters, wherein said first plurality of parameters are obtained based on keywords;
store said event in said first electronic calendar using said first plurality of parameters, wherein said stored event comprises a first link providing access to said electronic message;
modify said electronic message to comprise a second link providing access to said stored event;
identify a second user associated with said event based on said first plurality of parameters; and
store said event in a second electronic calendar using said first plurality of parameters, wherein said second electronic calendar is associated with said second user,
responsive to said second user using said first link to access said electronic message, notify the first user of said access by said second user,
responsive to storing said event in said first electronic calendar, automatically scan the in-box of the first user for at least one other electronic message related to the stored event; and
in response to finding at least one other electronic message related to the stored event:
modify said stored event to include one or more additional links providing access to each other electronic message related to the stored event and
modify each other electronic message related to the stored event to include a link providing access to said stored event,
wherein the electronic calendar application, the scheduling service application, and the electronic mail application are executing on the processor.

15. The system described in claim 14, further comprising a means for coordinating a stored event in the electronic calendars of a plurality of users.

16. The system of claim 14, wherein said scheduling service application further scans said first portion of said electronic message to locate user specified key words in said first portion of said electronic message.

17. The system of claim 14, wherein said keywords comprises temporal keywords and priority keywords for calculating a date and time for said event.

18. The system of claim 14, wherein said scheduling service application further presents a dialog to said first user showing said first plurality of parameters of said event prior to storing said event.

19. The system of claim 14, wherein said scheduling service application further links said electronic message to said stored event.

20. The system of claim 14, wherein said scheduling service application further links said stored event to said electronic message.

21. The system of claim 14, wherein said event comprises a meeting.

22. The system of claim 21, wherein said information associated with said event comprises a date related to said meeting.

23. The system of claim 21, wherein said information associated with said event comprises a designation of an attendee of said meeting.

24. The system of claim 21, wherein said information associated with said event comprises an agenda for said meeting.

25. The system of claim 14, wherein said scheduling service application further comprises software instructions stored in the memory for enabling the system to:
scans said first portion of said electronic message for information associated with a second event;

processes said information associated with said second event to obtain a second plurality of parameters, wherein said second plurality of parameters are obtained based on said keywords;

stores said second event in said first electronic calendar application using said second plurality of parameters.

26. The system of claim 25, wherein said scheduling service application further comprises software instructions stored in the memory for enabling the system to link said stored second event to said stored event.

27. A computer readable medium comprising computer program code for scheduling an event based on an electronic message, said computer program code comprising instructions to:

receive from a first user a request to schedule said event based on a first portion of said electronic message, wherein said first portion of said electronic message is specified by said first user;

responsive to said request from said first user, automatically, by a scheduling service, schedule said event in a first electronic calendar associated with said first user by:

accessing said first portion of said electronic message from an electronic message in-box;

scanning said first portion of said electronic message for information associated with said event;

processing said information associated with said event to obtain a first plurality of parameters, wherein said first plurality of parameters are obtained based on keywords;

storing said event in said first electronic calendar using said first plurality of parameters, wherein said stored event comprises a first link providing access to said electronic message;

modifying said electronic message to comprise a second link providing access to said stored event;

identifying a second user associated with said event based on said first plurality of parameters; and storing said event in a second electronic calendar using said first plurality of parameters, wherein said second electronic calendar is associated with said second user; and responsive to said second user using said first link to access said electronic message, notify the first user of said access by said second user;

responsive to automatically scheduling said event, automatically scanning the in-box of the first user for at least one other electronic message related to the stored event; and in response to finding at least one other electronic message related to the stored event:

modifying said stored event to include one or more additional links providing access to each other electronic message related to the stored event, and modifying each other electronic message related to the stored event to include a link providing access to said stored event.

28. The computer readable medium of claim 27, wherein said scanning said portion of said electronic message comprises seeking user specified key words in said portion of said electronic message.

29. The computer readable medium of claim 27, wherein said event comprises a meeting.

30. The computer readable medium of claim 29, wherein said information associated with said event comprises a date related to said meeting.

31. The computer readable medium of claim 29, wherein said information associated with said event comprises a designation of an attendee of said meeting.

32. The computer readable medium of claim 29, wherein said information associated with said event comprises an agenda for said meeting.

33. The computer readable medium of claim 27 wherein said instructions to schedule said event further comprise instructions to present a dialog to said first user showing said first plurality of parameters of said event prior to storing said event.

34. The computer readable medium of claim 27, wherein said instructions for storing said event further comprise instructions for coordinating said event with an electronic calendar of another user.

35. The computer readable medium of claim 27, wherein said instructions to schedule said event further comprise instructions for linking said electronic message to said stored event.

36. The computer readable medium of claim 27, wherein said instructions to schedule said event further comprise instructions for linking said stored event to said electronic message.

37. The computer readable medium of claim 27, wherein said keywords comprises temporal keywords and priority keywords for calculating a date and time for said event.

38. The computer readable medium of claim 27, said computer program code further comprising instructions to:

scan said first portion of said electronic message for information associated with a second event;

process said information associated with said second event to obtain a second plurality of parameters, wherein said second plurality of parameters are obtained based on said keywords; and store said second event in said first electronic calendar using said second plurality of parameters.

39. The computer readable medium of claim 27, said computer program code further comprising instructions to link said stored second event to said stored event.

* * * * *